United States Patent
Nishimoto et al.

Patent Number: 5,471,050
Date of Patent: Nov. 28, 1995

[54] PHOTOELECTRIC CONVERSION METHOD AND APPARATUS THEREOF

[75] Inventors: Ikuo Nishimoto; Minoru Tanaka, both of Kanagawa, Japan

[73] Assignee: Yamatake-Honeywell Co., Ltd., Tokyo, Japan

[21] Appl. No.: 144,798

[22] Filed: Oct. 28, 1993

[30] Foreign Application Priority Data

| Aug. 3, 1993 | [JP] | Japan | 5-192613 |
| Aug. 3, 1993 | [JP] | Japan | 5-192614 |
| Aug. 3, 1993 | [JP] | Japan | 5-192615 |
| Aug. 3, 1993 | [JP] | Japan | 5-192617 |

[51] Int. Cl.$^6$ .................. H01J 40/14; G01J 1/20
[52] U.S. Cl. ............... 250/214 A; 250/208.2; 250/201.6; 356/4.01
[58] Field of Search .................. 250/561, 201.6, 250/208.2, 205, 214 A; 356/1, 4

[56] References Cited

U.S. PATENT DOCUMENTS

| 4,339,665 | 7/1982 | Utagawa | 250/208.2 |
| 4,523,101 | 6/1985 | Tsunekawa | 250/208.2 |

FOREIGN PATENT DOCUMENTS

1243305 10/1986 Japan ................. 250/208.2

*Primary Examiner*—Anita Pellman Gross
*Assistant Examiner*—Tiep H. Nguyen
*Attorney, Agent, or Firm*—Lane, Aitken & McCann

[57] ABSTRACT

In the photoelectric conversion method and apparatus applicable to displacement sensors irradiating light to objects and sensing the distances to the objects, distance-determining type photoelectric sensors etc., the method and apparatus arrange n (n>2) light-receiving elements in a predetermined direction, and divide each photoelectric current I1, I2, ..., In of each light-receiving element in predetermined ratios k1 to 1-k1, k2 to 1-k2, ..., kn to 1-kn; and lead the divided photoelectric currents to the first and the second photoelectric current output terminal, and control the predetermined ratios k1, k2, ..., kn in keeping such relationships as k1>0.5>kn and km≦kp (p=m-1; m=2 to n), therefore the arbitrary positions on the light-receiving surface can be set in high sensibility, and high speed responsibility can be attained.

19 Claims, 11 Drawing Sheets

NEAR DISTANCE ZONE

AREA CAPABLE OF SETTING THE SENSING LIMITATION

DISTANCE TO AN OBJECT TO BE SENSED X

PHOTOELECTRIC CONVERSION METHOD AND APPARATUS THEREOF

BACKGROUND OF THE INVENTION

1. Field of the Invention

This invention relates generally to photoelectric conversion method and apparatus thereof for sensing light positions, and more particularly to such photoelectric apparatus as photoelectric switches for sensing the presence of objects optically, displacement sensors for sensing distances to objects by using optical reflection or for sensing displacements from preset points, and photoelectric sensors applicable to the displacement sensors or distance-determining type photoelectric switches.

2. Description of the Prior Art

Conventionally, direct reflection type photoelectric switches have been used as photoelectric conversion apparatus. They have been equipped; with a light-irradiating section and a light-receiving section on a common housing and have sensed the light irradiated from the light-irradiating section and reflected diffusively by the surface of objects to be sensed on the light-receiving section.

As the direct reflection type photoelectric switches can be operated in the state of being equipped in only one sensor housing and do not need such auxiliary parts as reflection plates, they have such advantages as being easily attached, adjusted and maintained, and cheap. Accordingly they have been used widely.

However, the direct reflection type photoelectric switches may have following problems, since they utilize the light scattered on objects.
That is:

(A) The sensible distance is shorter than other systems'.

(B) The sensible distances vary widely depending on the surface reflectances of objects to be sensed.

(C) In the case where the reflectance of a background is large, it is impossible to sense small reflectance objects being in front of the background.

A distance-determining type photoelectric switch composed for solving these problems, especially the problem (B) and (C), is disclosed in Japanese Patent Publication Syo 58-42411. Although this photoelectric switch is same as the direct reflection type photoelectric switch in the point that it irradiates light from its light-irradiating section to objects to be sensed and catches the light scattered on the objects on its light-receiving section, it is characterized in its light-sensing method in the light-receiving section.

FIG. 1 is a vertical section view showing the composition and operation of a light-position-sensing element 10 used in conventional photoelectric switches. FIG. 2 is a characteristic diagram explaining the characteristic of the light-position-sensing element 10 disclosed in FIG. 1. FIG. 3 is a diagram showing the photoelectric switch's construction drawn with single lines to explain the basic operation of the photoelectric switch for position-sensing as a photoelectric conversion apparatus. FIG. 4 is a characteristic diagram showing a relationship between distances X from the photoelectric switch to objects to be sensed and incident light positions Y, where bright spot images are formed, on a light-receiving surface.

In FIG. 3 above noted, "1" denotes a photoelectric switch. "2" denotes a lens system mainly composed of lenses, corresponding to the optical system. "3" denotes a light-irradiating section mainly composed of such a light-emitting element as a light-emitting diode. "4" denotes a light-receiving section disposed on a-light-receiving surface, mainly composed of light-receiving elements. The light-position-sensing element 10 is disposed on the light-receiving surface. "5", "6" and "7" respectively denote a signal processing section, objects to be sensed, and a background.

Now, in the case where incident light exists in the position where the light-position-sensing element 10 is located, two electric current outputs Ia and Ib are obtained from the light-position-sensing element 10. Then, the incident light position Y on the light-position-sensing element 10 is derived from the following equation:

$$(Ia-Ib)/(Ia+Ib)=2Y/L \qquad (1)$$

where "L" denotes the effective length of the light-position-sensing element 10.

The relationship of the equation (1) can be depicted as FIG. 2. As mentioned above, the incident light position Y on the light-position-sensing element 10 can be derived using electric signals. So the light-position-sensing element 10 has been used in photoelectric switches, as shown in FIG. 3.

Namely, the photoelectric switch 1 is equipped with the lens system 2, the light-irradiating section 3, the light-receiving section 4 and the signal-processing section 5, as shown in FIG. 3. Generally, such kinds of photoelectric switches are used for sensing the presence of objects to be sensed. For example, being disposed near a conveyor, they are used for sensing the presence of monitors equipped in computers conveyed by the conveyor.

Then, the light irradiated from the light-irradiating section 3 forms bright spots on the objects 6, i.e. 6A and 6B. Further, the light reflected by the objects 6 forms bright spot images on the light-receiving surface of the light-receiving section 4 through the lens system 2. In the case where the distances X to the objects 6 vary, the bright spot image positions Y move. Accordingly, determining the bright spot image positions Y on the light-receiving surface makes it possible to determine whether the bright spot images was formed by the objects 6 or by the background 7 placed on a farther point from the photoelectric switch 1 than the sensing objects 6 are located.

Consequently, the light-position-sensing element 10 shown in FIG. 1 is located on the light-receiving surface of the light-receiving section 4 for determining the bright spot image positions, i.e. the incident light positions Y. Then, the photoelectric switch generates sensing signals when the bright spot image positions Y are larger than a predetermined value. The photoelectric switches in this type have such a great deal of superior characteristics solving the above described problems of (B) and (C) compared to the switches of the type of sensing the quantity of light on the light-receiving surface that the sensible distance scarcely varies in spite of the variation of the surface reflectances of the objects to be sensed, and the objects can be sensed stably in the case where small reflectance objects to be sensed, e.g. black receptacles, flow between a large reflectance background 7, e.g. a white wall, and the photoelectric switch.

Next, the relationship between the distances X and the incident light positions Y is expressed by the next equation:

$$X * Y = L2 * L3$$

where L2 denotes optical axis pitches between projected lights and received lights, and L3 denotes the lens lengths of the light-receiving elements. It is FIG. 4 that depicts this X–Y relationship. Thus, the light-position-sensing element 10 can derive the incident light positions Y electrically, and then the distances X can be obtained. Therefore it has been widely used in displacement sensors outputting differences from a reference distance as displacements.

Because conventional photoelectric conversion methods and apparatus are composed as above mentioned, the relationships between the distances X to the objects 6 and the bright spot image positions Y on the light-receiving surface are nonlinear, as shown in FIG. 4, in the case where the light-position-sensing elements are applied to the photoelectric switches. That is, when the distances X to the objects 6 are small, the variations of the bright spot image positions Y on the light-receiving surface are large compared to the distances X to the objects 6. Then the variation amount of two output currents Ia and Ib of the light-position-sensing element 10 is large, so the bright spot image positions Y can be operated precisely, and the distances X to the objects 6 can be determined precisely. However, the variations of the bright spot image positions Y are small compared to the distances X to the objects 6 in the case where the distances X to the objects 6 are large. Then the variation amount of two output currents Ia and Ib of the light-position-sensing element 10 is small, so the bright spot image positions Y cannot be operated precisely and the distances X to the objects 6 cannot determine precisely. Though this situation can be improved by enlarging the distances from the light-irradiating axis to the light-receiving section 4, it brings about such a defect that the sizes of photoelectric switches are enlarged. Further the brightness of the bright spots on the light-receiving surface becomes dark in proportion to to the distances X to the objects 6, then the influence of noises comes to be large and the accuracy of the determination of distances comes to be bad. So, it is impossible to lengthen the measurable distance of the photoelectric switch.

Also, the application of the light-position-sensing element 10 to displacement sensors makes X * Y=L2 * L3 large, and improves its distance measurement sensitivity, however, not only the problem that the size of the sensor comes to large happens, but the problems as will be described next are caused by the application.

That is, the amount of variations of Y must not be exceeding L in the case where the effective length L of the light-receiving surface is assumed to be constant, because Y varies much compared to X. Then the span of X comes to be very narrow, even though the setting of the reference distance is made to be variable. Therefore, even if the light-position-sensing element 10 is effective for such a fine adjustment as the correction of errors of the reference distance, it has such problems that the reference distances is not changeable.

SUMMARY OF THE INVENTION

A first object of the invention is to provide the photoelectric conversion method and apparatus the arbitrary positions on a light-receiving surface of which can be set in high sensitivity and whose response speed is high.

A second object of the invention is to provide the photoelectric conversion apparatus as a photoelectric switch which enables long distance measurement with high sensibility.

A third object of the invention is to provide the photoelectric conversion apparatus as a displacement sensor of which the distance span to be set is wide and which has high sensitivity and high preciseness.

A fourth object of the invention is to provide the photoelectric conversion apparatus as a displacement sensor of which optical axis aberration can be corrected electrically and which can correct the nonlinearity of the determination reference distances.

A fifth object of the invention is to provide the photoelectric conversion method and apparatus of which light-receiving surface can be equivalently made small in spite of lengthening the actual length on the light-receiving surface.

The photoelectric conversion method of the invention to attain the first object comprises the steps of: arranging n (n>2) light-receiving elements in a predetermined direction; dividing each photoelectric current I1, I2, . . . , In of each of the light-receiving elements in predetermined ratios k1 to 1−k1, k2 to 1−k2, . . . , kn to 1−kn; leading the divided photoelectric currents to the first and the second photoelectric current output terminal; and controlling the predetermined ratios in keeping such relationships as k1>0.5>kn and km≦kp (p=m−1; m=2 to n).

The photoelectric conversion apparatus of the invention to attain the first object comprises: n (n>2) light-receiving elements arranged in a predetermined direction; a current-division section having n current dividers which divide each photoelectric current I1, I2, . . . , In of each of the light-receiving elements in predetermined ratios k1 to 1−k1, k2 to 1−k2, . . . , kn to 1−kn, and lead each part to the first and the second photoelectric current output terminal respectively; and a current-division-controlling section for controlling the predetermined ratios k1, k2, . . . , kn in keeping such relationships as k1>0.5>kn and km≦kp (p=m−1; m=2 to n).

The photoelectric conversion apparatus of the invention to attain the second object comprises: a light-irradiating section for forming a bright spot on an object to be sensed by irradiating light from its irradiating axis; a light-receiving section for forming the bright spot image on the object on a light-receiving surface through a lens system; n (n>2) light-receiving elements arranged in a direction combining a light-irradiating axis and a light-receiving axis; a current-division section having n current dividers which divide each photoelectric current I1, I2, . . . , In of each of the light-receiving elements in predetermined ratios k1 to 1−k1, k2 to 1−k2, . . . , kn to 1−kn, and lead each divided current to the first and the second photoelectric current output terminal respectively; an operation section inputted the first and the second photoelectric current output and outputting a sensed signal; and a current-division-controlling section for controlling the predetermined ratios k1, k2, . . . , kn in keeping such relationships as k1>0.5>kn and km≦kp (p=m−1; m=2 to n).

The photoelectric conversion apparatus of the invention to attain the third object comprises: a light-irradiating section for forming a bright spot on an object to be sensed by irradiating light from its irradiating axis; a light-receiving section for forming a bright spot image on the object on a light-receiving surface through a lens system; n (n>2) light-receiving elements arranged in a direction combining the light-irradiating axis and a light-receiving axis on the light-receiving surface; a current-division section having n current dividers which divide each photoelectric current I1, I2, . . . , In of each of the light-receiving elements in predetermined ratios k1 to 1−k1, k2 to 1−k2, . . . , kn to 1−kn, and lead each divided current to the first and the second photoelectric current output terminal respectively; setting section for setting a reference distance; a current-division-controlling section for controlling the predetermined ratios k1, k2, . . . , kn in keeping such relationships as k1>0.5>kn and km≦kp (p=m−1; m=2 to n) and corresponding to the reference distance in the setting section; and an operation section inputted the first and the second photoelectric current output and outputting displacements from the reference distance.

The photoelectric conversion apparatus of the invention to attain the forth object has a setting section composed of a reference resistor and a setting resistor comprising the parallel circuit of a variable resistor trimmer and a fixed resistor, the setting section adjusting the dividing ratios k1, k2, . . . , kn, and setting the distance of a photoelectric sensor in the photoelectric conversion apparatus to attain the second object, the reference resistor is composed of a trimming resistor correcting the aberration between the light-irradiating axis and the light-receiving axis.

The photoelectric conversion method of the invention to attain the fifth object comprises the steps of: arranging n (n>2) light-receiving elements (j) {j=1~n} in a predetermined direction; dividing each photoelectric current I(j) of each of the light-receiving elements in four parts I1(j), I2(j), I3(j) and I4(j) in the ratios of k1(j), k2(j), k3(j) and k4(j) respectively; leading them to the first, the second, the third and the fourth photoelectric current output terminal respectively; and making the ratios k1(j), k2(j), k3(j) and k4(j) meet the equation of k1(j)+k2(j)+k3(j)+k4(j)=1, and making k3(j)/k1(j), k1(j)/k2(j) and k2(j)/k4(j) decrease with j, further making them meet the expressions of k1(1)>k2(1) and k1(n)<k2(n).

The photoelectric conversion apparatus of the invention to attain the fifth object comprises: a light-receiving section composed of n (n>2) light-receiving elements (j) {j=1~n} arranged in a predetermined direction; a current division section having j current dividers for dividing each photoelectric current I(j) of each light-receiving element (j) in four parts I1(j), I2(j), I3(j) and I4(j) in the ratios of k1(j), k2(j), k3(j) and k4(j) respectively; the first, the second, the third and the fourth photoelectric current output terminal for collecting each of the current parts I1(j), I2(j), I3(j) and I4(j) respectively; a setting section for setting current-division ratios; and a current-division-controlling section for setting the ratios k1(j), k2(j), k3(j) and k4(j).

BRIEF DESCRIPTION OF THE DRAWINGS

Preferred forms of the present invention are illustrated in the accompanying drawings in which.

DETAILED DESCRIPTION OF THE PREFERRED EMBODIMENTS

This invention will be described in further detail by way of preferred embodiments with reference to the accompanying drawings, hereinafter.

Figure 1:
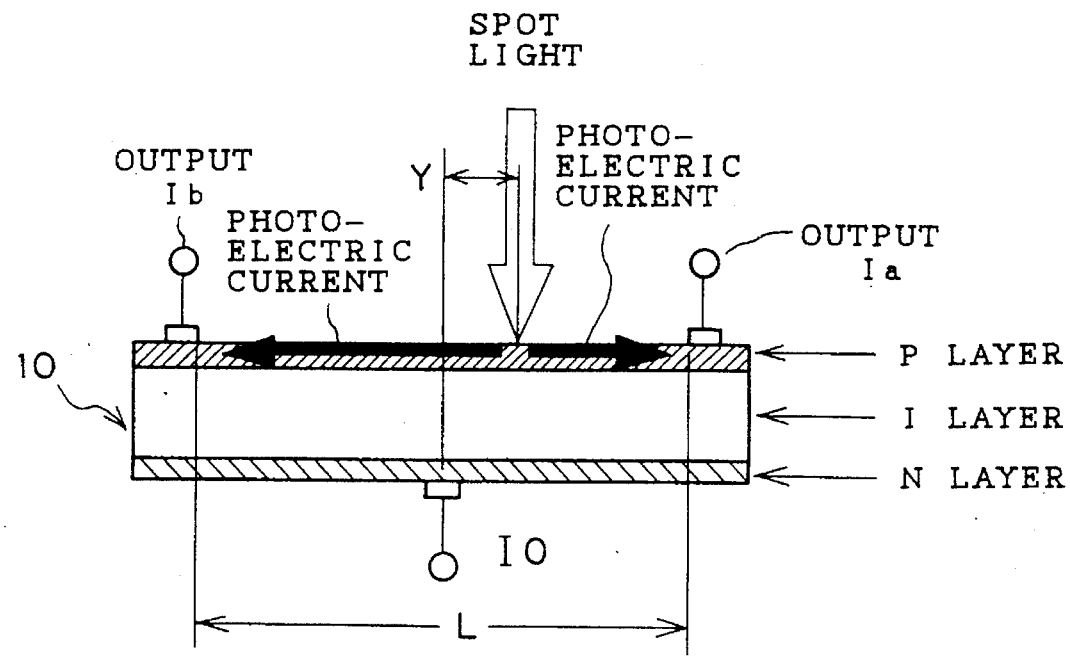
FIG. 1 is a cross sectional view explaining the composition and the operation of a conventional light-position-sensing element.
Figure 2:
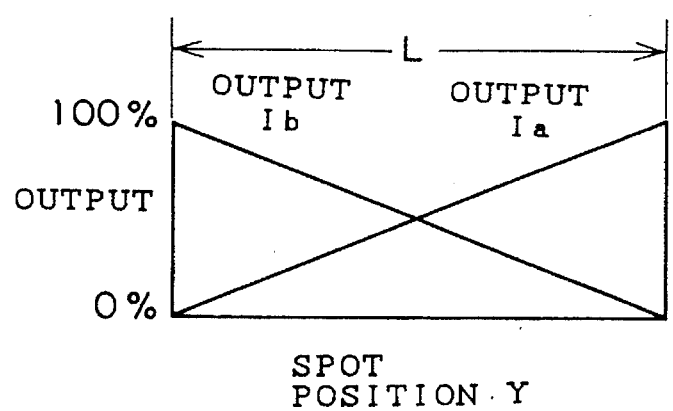
FIG. 2 is a characteristic diagram explaining the characteristic of the light-position-sensing element shown in FIG. 1.
Figure 3:
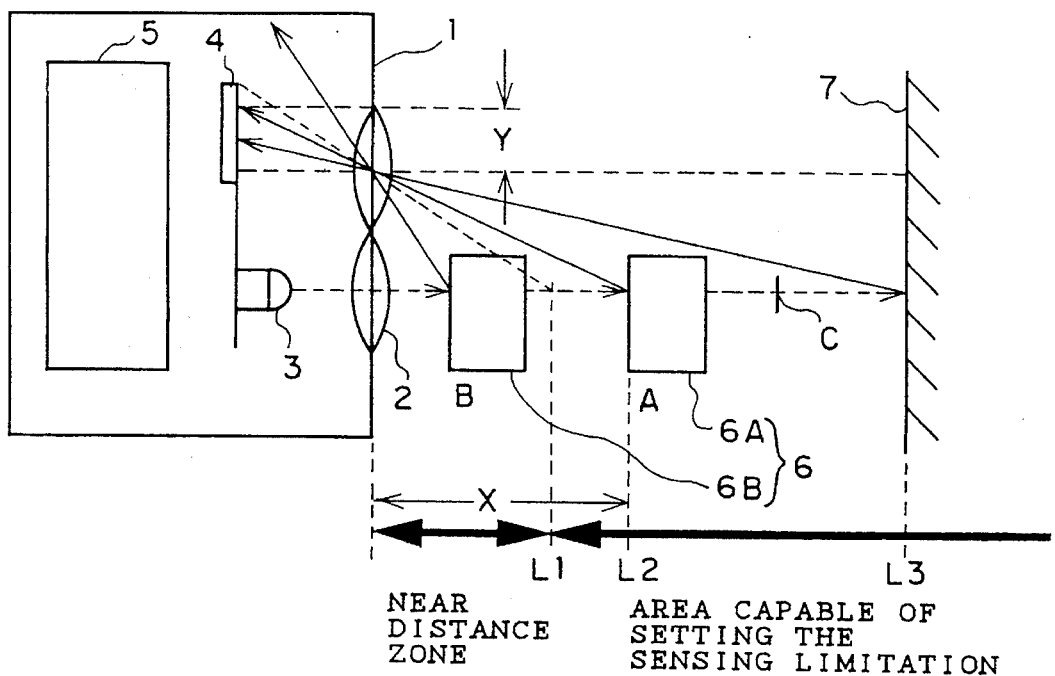
FIG. 3 is a compositional diagram drawn with single lines to explain the basic operation of a photoelectric switch for position-sensing (or a displacement sensor).
Figure 4:
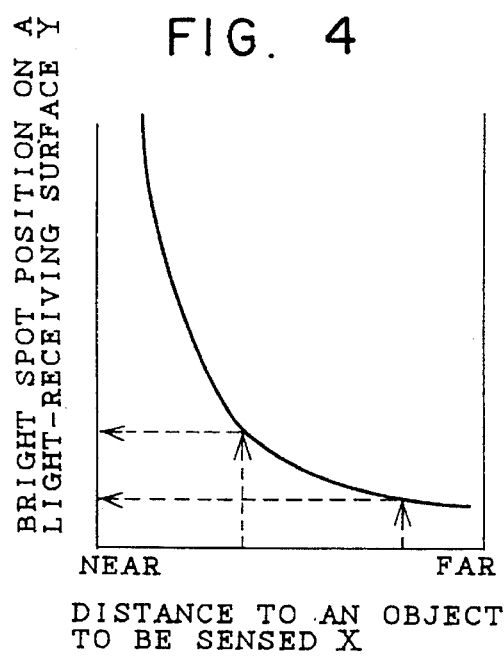
FIG. 4 is a characteristic diagram showing a relationship between the distance X from a photoelectric switch (or a displacement sensor) to an object to be sensed and the position of a bright spot image on a light-receiving surface.
Figure 5:
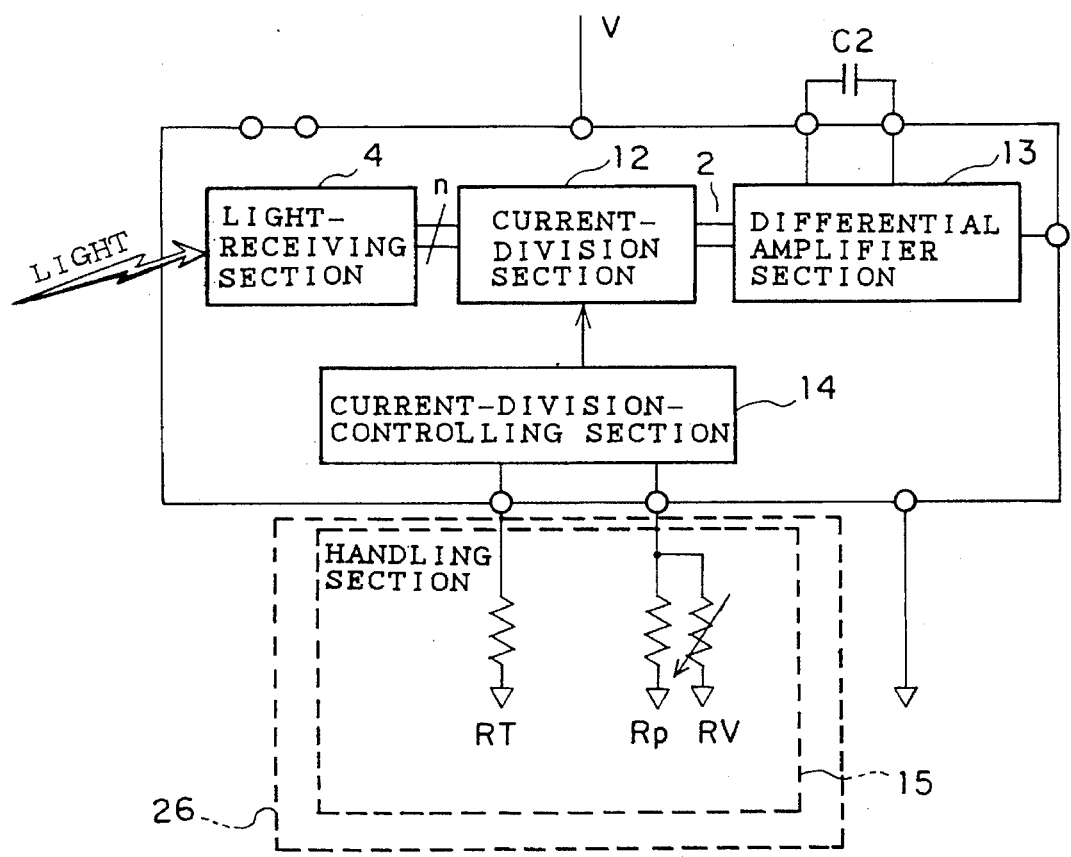
FIG. 5 is a general block diagram of the photoelectric conversion apparatus according to the present invention.
Figure 6:
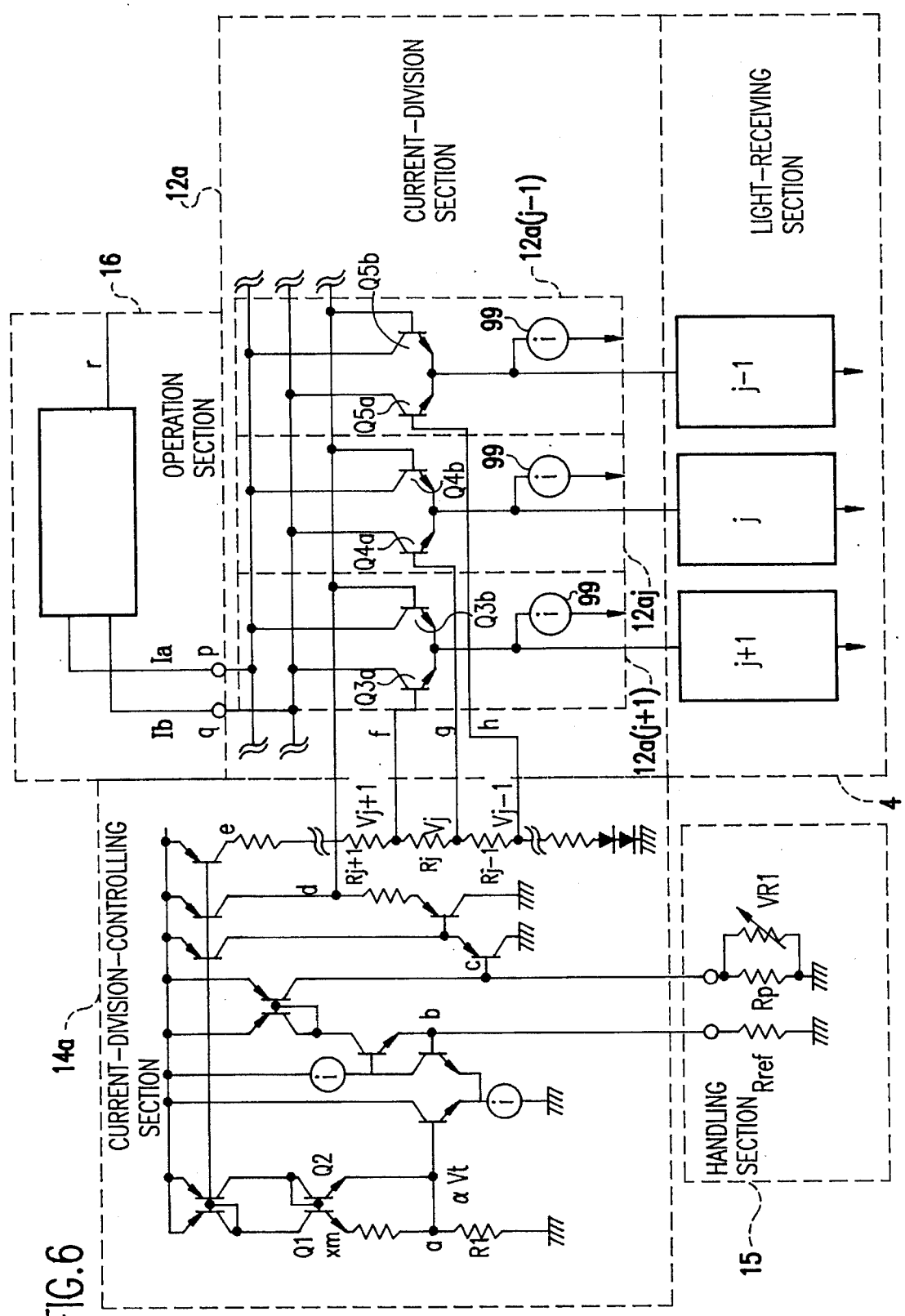
FIG. 6 is a circuit diagram showing a first embodiment of the current-division section and the current-division-controlling section of FIG. 5 in detail.
Figure 7:
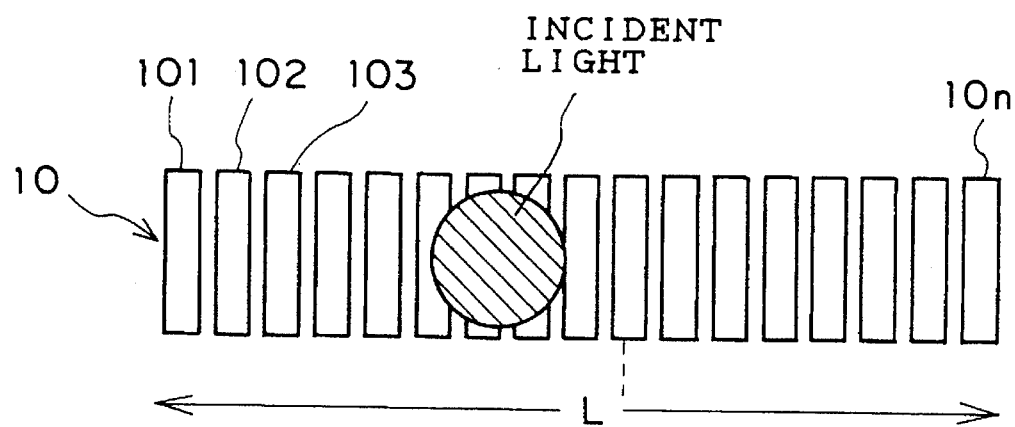
FIG. 7 is a plan view showing the arrangement of the light-receiving elements arranged in the light-receiving section in FIG. 5.
Figure 8:
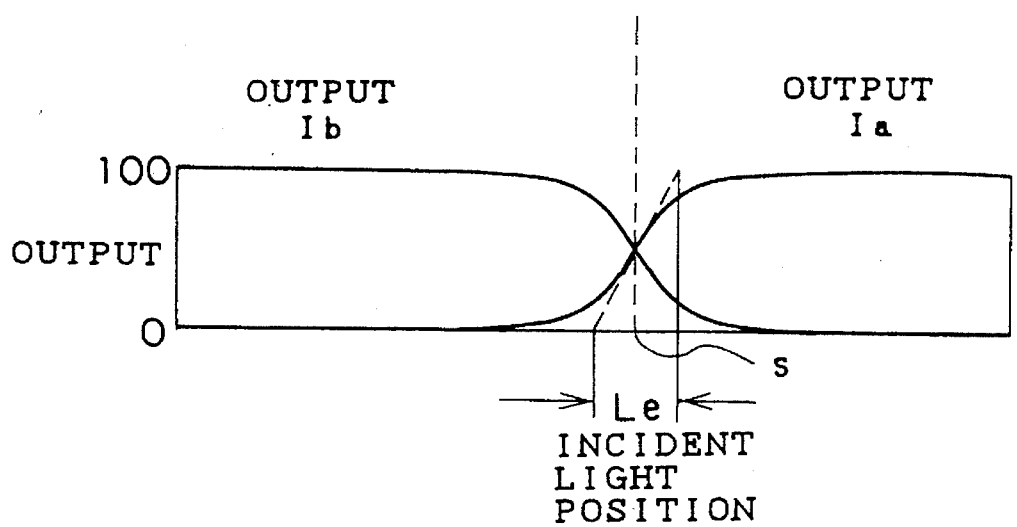
FIG. 8 is a characteristic diagram explaining the light-position-sensing sensibility of the light-receiving section in FIG. 5.

FIG. 5 is a general block diagram of the photoelectric conversion apparatus according to the present invention; FIG. 6 is a circuit diagram showing a first embodiment of the current-division section and the current-division-controlling section of FIG. 5 in detail; FIG. 7 is a plan view showing the arrangement of the light-receiving elements arranged in the light-receiving section of the invention; FIG. 8 is a characteristic diagram explaining the light-position-sensing sensibility of the light-receiving section of the invention.

In FIG. 5, the output terminal of the light-receiving section 4 is connected to a current-division section 12, and the output terminal of the current-division section 12 is connected to a differential amplifier section 13. The current-division section 12 is also connected to a current-division-controlling section 14 for controlling the current-division section 12. Further, the current-division-controlling section 14 is connected to a setting section 26. And in the part of the setting section 26 is provided a handling section 15. It is a matter of course that the setting section 26 can be formed in one body incorporated with the current-division-controlling section 14 in a circuit. But for better understanding, the setting section 26 is depicted in a separated state from the current-division-controlling section 14.

Then, the incident light into the light-receiving section 4 is converted to photoelectric current to be provided to the current-division section 12. The light-receiving elements of the light-receiving section 4 is composed, for example, by arranging in a designated direction which combines the light-receiving axis and the light-irradiating axis many light-receiving elements 10, i.e. 101, 102, 103, . . . , 10n, as shown in FIG. 7. The photoelectric current from each light-receiving element is divided in the predetermined ratios kj to 1−kj (j=1~n; 0≤kj≤1) to be connected to the first photoelectric current output terminal and the second photoelectric current output terminal. That is, much photoelectric current from many light-receiving elements 101, 102, 103, ..., 10n is converted into two photoelectric current signals Ia and Ib. As the signal-processing subsequent to this point does not particularly relate to the invention, the explanation of it is omitted.

That is, the subjective matter of the invention exists in the light-receiving section 4, current-division section 12 and current-division-controlling section 14, so these sections will be explained in detail.

In FIG. 6, it is known that a voltage $\alpha Vt$ proportioned to the Boltzmann voltage Vt (=kT/q) is generated at "a" point, and $\alpha$ is determined by the size ratio of the transistor Q1 and Q2. Therefore, the voltage at "b" point comes to $\alpha Vt$ irrespective of the value of the resistor Rref. A voltage is generated at "c" point responsively to the ratio of the resistor Rref and synthesized resistance value of the resistor Rp and the variable resistor VR1. The generated voltage at "c" point is shifted in a predetermined value to appear as the voltage at "d". The voltage at "d" is called a set voltage. The set voltage varies continuously according to the variation of the value of the variable resistor VR1.

As the current proportioned to the current flowing in a resistor R1 flows from "e" point, the voltages at "f" point, "g" point and "h" point become small in order. And the differences among each point's voltage values come to a constant value determined by the ratio of the resistor R1 to the resistor Rj and the Boltzmann voltage Vt. The voltage is used to the reference voltage. In this Fig., only three resistors including the resistor Rj and before and behind resistors of it are shown, but in fact suchlike resistors, to the number of the light-receiving elements 10, are connected in series.

The light-receiving elements except the jth one and before and behind ones of it in many light-receiving elements 101, 102, 103, ..., 10n are all omitted in the Fig. In the current-division section 12 are also depicted jth one and before and behind ones. Each current-division section has a differential amplifier 13, i.e. a couple of transistors Q3a, Q3b, Q4a, Q4b, Q5a and Q5b connected their emitters each other. Each light-receiving element 101, 102, 103, ..., 10n is connected to the emitters of these transistors Q3a, Q3b, Q4a, Q4b, Q5a and Q5b; one group of the collectors of each differential transistor Q3a, Q3b, Q4a, Q4b, Q5a and Q5b are connected to the first current output terminal p, the other group of the collectors of each differential transistor are connected to the second current output terminal q. Hereby, the n photoelectric currents of the n light-receiving elements are converted into two signals. The one group of the bases of each differential transistor are inputted reference voltages, and the other group of bases of each transistor are inputted the set voltage. Though the set voltage is a common voltage to each current divider, the reference voltages have a predetermined voltage difference to each current divider; the difference is the Boltzmann voltage multiplied by a constant.

Now, let us consider the case that the set voltage set by the variable resistor VR1 is near the jth reference voltage Vj. By adequately designing the reference voltage differences among adjoining current dividers 12(j+1) and 12(j−1) centering the jth current divider, it is possible to regard that the reference voltages of all of the current dividers from the first to the (j−2)th are small enough to the set voltage, so almost all of the photoelectric current of the light-receiving elements flows to the first current output terminal p, and that the reference voltages of all of the current dividers from the (j+2)th to nth are large enough to the set voltage, so almost all of the photoelectric current of the light-receiving elements flows to a second current output terminal q.

As the reference voltage Vj−1 of the (j−1)th current divider 12(j−1) is lower than the set voltage, much of the photoelectric current of the light-receiving element flows to the first current output terminal p. And, as the reference voltage Vj+1 of the (j+1)th current divider 12(j+1) is higher than the set voltage, much of the photoelectric current of the light-receiving element flows to the second current output terminal q. The photoelectric current of the jth light-receiving element flows to the first current output terminal p and the second current output terminal q, and the ratio of the current flowing to each output terminal can be set continuously by the value of the variable resistor VR1.

By composing the embodiment like above described, the output characteristic which has a sharp sensitivity to the variation of the incident light positions near the jth incident light position is obtained, as shown in FIG. 8, where the current on the first current output terminal p is presented by Ia and the current on the second current output terminal q is presented by Ib. That is, the characteristic near the jth position is equivalent to the characteristic of the light-position-sensing element which has the small total length Le of its light-receiving section, so the sensibility multiplied by L/Le can be obtained. The position having the sharp sensitivity is taken as the light-determining reference position Y0.

As described heretofore, the light-receiving element of this embodiment is equivalent to one which receives the light as a whole body and outputs two outputs from the first current output terminal p and the second current output terminal q.

Next, an operation section 16 is inputted two currents Ia and Ib, and operates a desirable output, e.g. displacements in the case where the photoelectric conversion apparatus is a displacement sensor, and then outputs it.

Further, by handling the value of the variable resistor VR1, the light-determining reference position Y0, being jth position in above embodiment, can be freely set to an arbitrary position from the first to the nth position. As the light-determining reference position Y0 corresponds to the determination reference distance X0, the determination reference distance X0 can be freely handled by varying the value of the variable resistor VR1.

As shown in FIG. 6, a fixed resistor Rref is paralleled to the variable resistor VR1, the nonlinearity of the relationship between the light-determining reference position Y0 and the determination reference distance X0 is corrected hereby. That is, the distance X and the position Y on the light-receiving surface are in an inverse proportion relationship.

Then, connecting the fixed resistor Rp to the variable resistor VR1 in parallel creates the nonlinearity of the synthesized resistance value of them to the handling amount of the variable resistor. The nonlinearity between the distance X and the position Y on the light-receiving surface is corrected hereby.

Figure 6A:
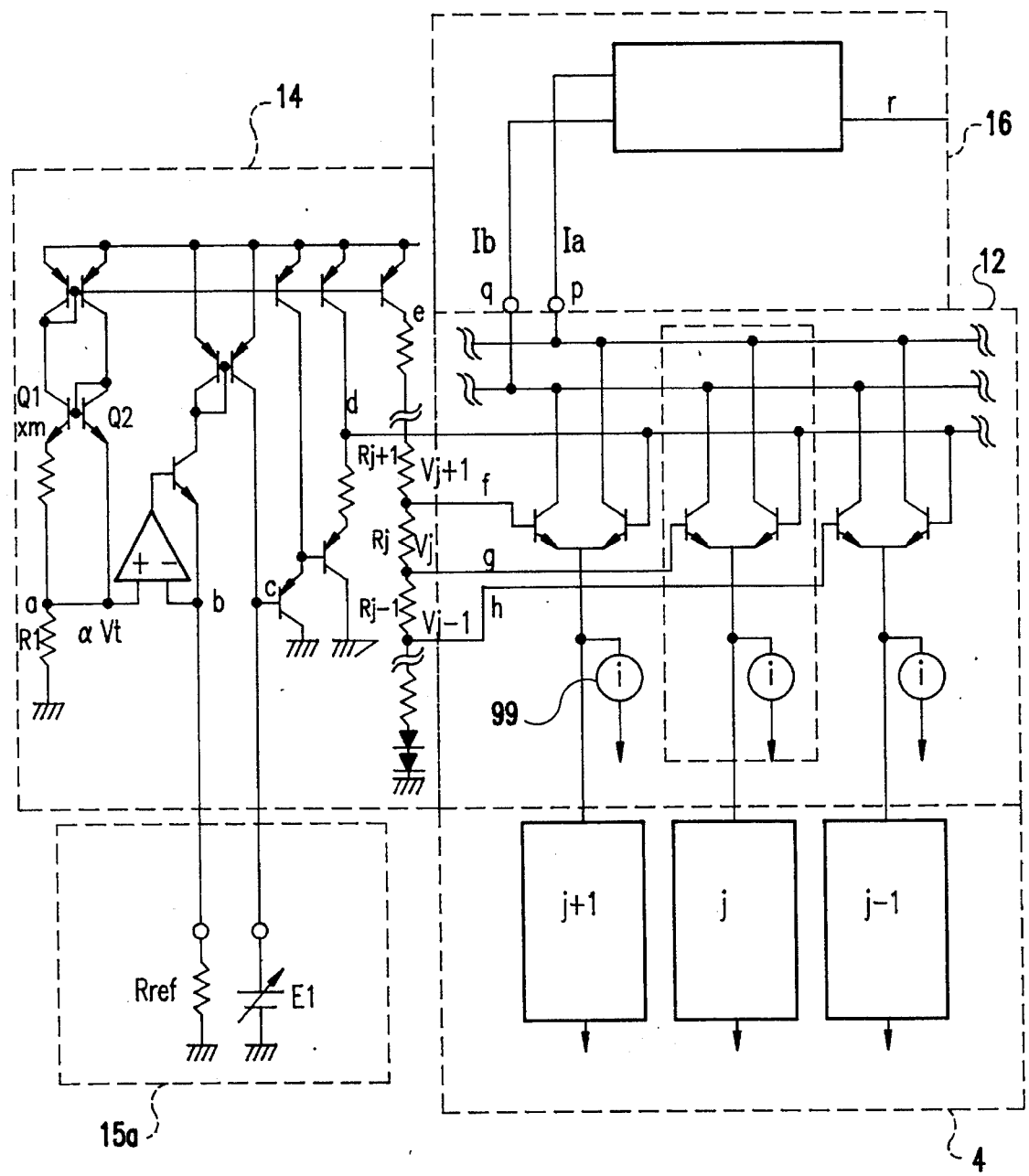
FIG. 6A is a modified version of the circuit shown in FIG. 6, illustrating a variable voltage battery to establish a current division control.

Heretofore, the explanation about the case that the current-division ratio is set based on the variable resistor VR1 in the handling section 15 has been made, but the setting of the current-division ratio may be possible, for example, by inputting voltage to "c" point from the outside as shown by a variable-voltage battery E1 shown in FIG. 6A instead of handling the variable resistor VR1. Because it obvious that the fully same light-position-determining sensibility can be obtained in this case, too, the photoelectric switch that can set and change the determination reference distance X0 by, e.g. the outside inputs from the photoelectric switch is possible to be realized.

And, by using the photoelectric conversion apparatus above mentioned and setting the position where light positions on the light-receiving surface can be sensed with high sensitivity for the light-determining reference position Y0, a highly sensible distance-determining type photoelectric switch and a displacement sensor can be realized.

That is, in the case where the position where light-position can be sensed with high sensibility is set for the light-determining reference position Y0, by making the light-determining reference position Y0 correspond to the determination reference distance X0, the output of the photoelectric conversion apparatus comes to compare the bright spot image position Y to the light-determining reference position Y0, and comes to compare the distance X to the determination reference distance X0. The photoelectric conversion switch can be changed to the distance-determining photoelectric switch by making it output the sign of (Y−Y0), and can be changed to the displacement sensor by making it output the signals corresponding to the magnitude of (Y−Y0).

The relationship between X and Y is denoted in the next equations.
That is:

$$Y=g/X \text{ or } X=g/Y \qquad (1)$$

where g is a constant determined by the used optical system.

Therefore, the distance X can be derived from sensing the bright spot image position Y.

Considering such tolerances as the size tolerances of the light-irradiating elements, the light-irradiating lenses, the light-receiving lenses, the light-receiving elements, etc. actually used, and the tolerances on composing, there is dispersion in the actual relative positions between the light-irradiating axis and the light-receiving axis. This dispersion causes errors in the Y values of the equation (1). On denoting these errors $\epsilon$, there happens no large errors in the operation deriving X in the case where the Y value is large enough compared to the $\epsilon$ value, but happens large errors in the operation deriving X in the case where the Y value is not large enough compared to the $\epsilon$ value. That is, the errors come to large in case of sensing large distances, there were cases where the errors exceed a practical limitation. Accurate parts were needed in some cases and precise location adjustments were needed on composing optical parts in other cases, since the permitted error ranges of relative positions among such optical system's parts as the light-irradiating element, the light-receiving element, etc. came to be very narrow on account of this reason.

Also, as the relationship between the determination reference distance X0 and the light-determination reference position Y0 could be denoted in equation (1), too, in the case where the light-determination reference position Y0 on the light-receiving surface responding proportionally to the handling amount of the handling section, the nonlinearity between the determination reference distance X0 and the handling amount came to be extreme and exceeded a practical limitation in sometimes due to its optical systems, etc. Because of this reason, it is preferable that the relationship of the light-determining reference position Y0 to the handling amount of the handling section has inverse-nonlinearity decreasing the nonlinearity of (1). As the nonlinearity above noted is determined by the sizes of optical systems, the ranges of setting, etc., means for correcting the values by anticipating is needed. But, the means must be able to change not fixed functions but constants easily, since the change of the sizes of optical systems, the range of setting, etc. brings about the change of the constants of nonlinear functions.

As before mentioned, on considering such tolerances as the size tolerances of the light-irradiating elements, the light-irradiating lenses, the light-receiving lenses, the light-receiving elements, etc. and the tolerances on composing, there is dispersion in the actual relative positions between the light-irradiating axis and the light-receiving axis. Especially, practicing accurate location adjustments on attaching the optical parts takes a long time, so an accurate location adjustment mechanism for accurate adjustments is needed.

Also, it is apprehended that the nonlinear relationship between the-light-determination reference position Y0 and the determination reference distance X0 comes to be extreme due to the conditions of its optical systems, the ranges of distances set, etc., and exceeds a practical limitation.

Therefore, the invention has the setting section composed of the reference resistor Rref and the setting resistor comprising the parallel circuit of the variable resistor VR1 and the fixed resistor Rp, the setting section adjusting the dividing ratios k1, k2, . . . , kn by the ratios of the reference resistor Rref to the setting resistor and setting the distance of the photoelectric sensor.

Now, let us denote the handling amount of the variable resistor VR1 as h (h=0~100%), the value of the synthesized resistor Rvp1 in that case as Rvp1(h), the light-determining reference position corresponding to Rvp1(h) as Y0(h), and the determination reference distance corresponding to Y0(h) as X0(h).

The direction of Y axis is determined so that the value of Y comes to small as the value of j comes to large. As the results of these settings, the light-determining reference position Y0(h) comes to be maximum and the determination reference distance X0(h) comes to be minimum when the adjustment amount of the setting resistor VR1 is VR1=0%, and the light-determining reference position Y0(h) comes to be minimum and the determination reference distance X0(h) comes to be maximum when the adjustment amount of the setting resistor VR1 is VR1=100%. As the effect of the aberration of light-axis is maximum, as mentioned before, when the value of Y is minimum, i.e. X is maximum, considerations will be taken on the case of h=100. Let us suppose that the bright spot image on the light-receiving surface does not position at the light-determining reference position Y0(100), but at {Y0(100)+δ} due to the aberration of light-axis in the case where an object exists at the point of the determination reference distance X0(100). In this state, even if the distance X varies near the determination reference distance X0(100), the bright spot image position Y corresponding to the distance X does not vary near the Y0(100), so the distance operated from the currents Ia and Ib comes to have very large errors compared to the actual distance X.

Then, as the current flowing the reference resistor Rref changes by trimming the reference resistor Rref, the voltage generated on the synthesized resistor Rvp1 changes, and the light-determining reference position Y0 comes to change consequently. Therefore the same currents Ia and Ib as ones flowing in the case where the light axis aberration does not happen can be obtained because the light-determining reference position Y0 changes to {Y0(100)+δ}. That is, the errors happened in the case where h=100 and an object exists on the determination reference distance X0(100) comes to be corrected by the Rref's trimming making the current Ia and Ib come to the predetermined value.

As the relationship between the setting resistor VR1 and the fixed resistor Rp does not change in this method, the inverse-nonlinearity set with the handling amount h of the setting resistor VR1 and the synthesized resistor Rvp1 is not influenced.

Heretofore, the correction of the errors occurred by the aberration of the light axis is described. As the errors in the case where the determination reference distance X0 is near, as be seen from the equation (1), does not influence much, the measurement by means of the invention is equivalent to one that scarcely has the aberration of the light axis.

In the relationship between the handling amount and the value of the synthesized resistor Rvp1, there is an relationship that the value of the synthesized resistor Rvp1 comes to 0 in the case where h is 0. As the synthesized resistor Rvp1 is near the synthesized resistor Rvp1(h) in the case where h is small and VR1(h)<Rp, the variation of the synthesized resistor is large when the h varies. As the synthesized resistor Rvp1 is near the fixed resistor Rp in the case where the h is large to come to VR1(h)>Rp, the variation of the synthesized resistor Rvp1 comes to be small when the h varies. As the nonlinearity inclines to correct the X–Y nonlinearity, the relationship between the h and the X0 can be brought close to be linear.

In the above mentioned photoelectric conversion apparatus, the photoelectric current from n (n>2) light-receiving elements is divided to the first photoelectric current output terminal and the second photoelectric current output terminal. As k1>0.5, much of the photoelectric current from the first light-receiving element flows into the first photoelectric current output terminal. As 0.5>kn, much of the photoelectric current from the nth light-receiving element flows into the second photoelectric current output terminal. As km≦kp (p=m−1; m=2 to n), there is a position between the first and the nth position where the current ratio flowing to the second photoelectric current output terminal is larger than one flowing to the first photoelectric current output terminal. The light-receiving element is equivalent to one which is divided into two parts at the above mentioned position of the light-receiving element 4, and one of whose parts gives photoelectric current to the first photoelectric current output terminal, the other of whose parts gives photoelectric current to the second photoelectric current output terminal. The equivalent dividing position is determined by the ratios kj (j=1 to n; 0≦kj≦1) determined in current-division-controlling section 14. This divided light-receiving element is equivalent to one receiving light on whole body and having two outputs one of which comes from the first current output terminal p and the other of which comes from the second, current output terminal q. The light-position-sensing sensibility at a predetermined position of the divided light-receiving element comes to be multiplied by L/Le from FIG. 7 and FIG. 8, and the position s where the sensibility comes to be high by the multiplication can be set at a desired position by a setting apparatus.

By the way, the light-receiving elements on the light-receiving surface other than the high light-position-sensing sensibility section s in FIG. 8 can be omitted in some cases, or it is preferable that they don't exist in other cases. That is, it is theoretically possible to discriminate electrically the direct current component of light, e.g the sunlight etc., from the light from the light-irradiating section 3, e.g. a pulse light, but actually the permitted limitation of direct current component exists, since the circuit comes to be saturated by too large direct current component. Also, such circuit noises as shot noises are generated by the direct current component. Further, as alternative current light other than the light from the light-irradiating section 3 is photoelectrically converted excessively, this comes to be a noise. Though shortening the total length L of the light-receiving element array decreases the problems above mentioned, the capable setting range of the positions having high sensibility comes robe narrow in proportion to it. Then, the method can not be applied to uses needing wide capable setting range.

Therefore the invention obtains equivalently short light-receiving section by handling only the current from the light-receiving elements as effective signals without shortening the total length L of the light-receiving element array, and the light-receiving elements locates nearer section than a predetermined distance from the set position where light-position-sensing sensibility is high. Hereinafter, the invention will be described in further detail with reference to the accompanying drawings.

Figure 9:
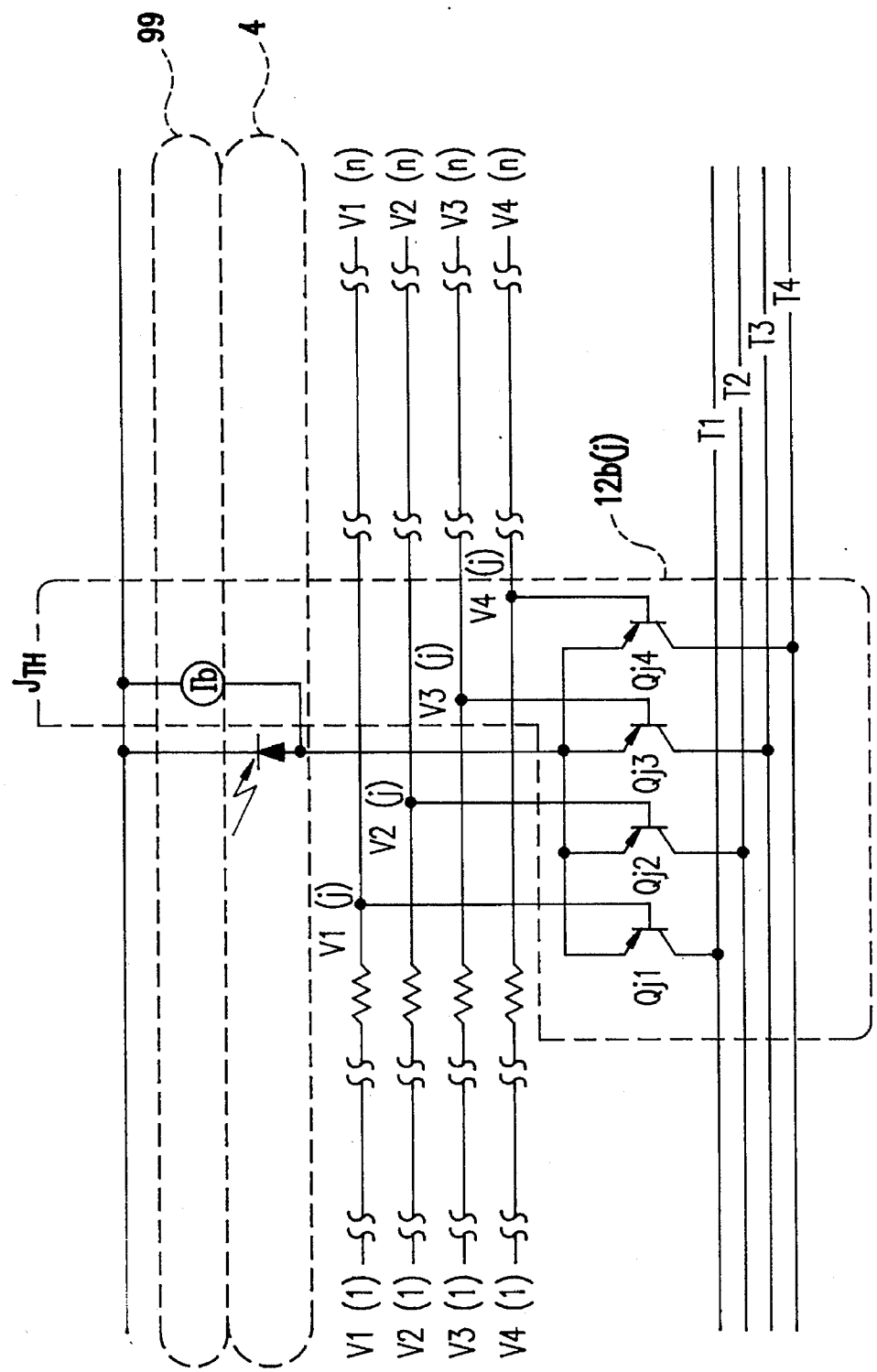
FIG. 9 is a second embodiment of the current-division section, a part of the light-receiving section and a part of the current-division-controlling section of FIG. 5 in detail.
Figure 10:
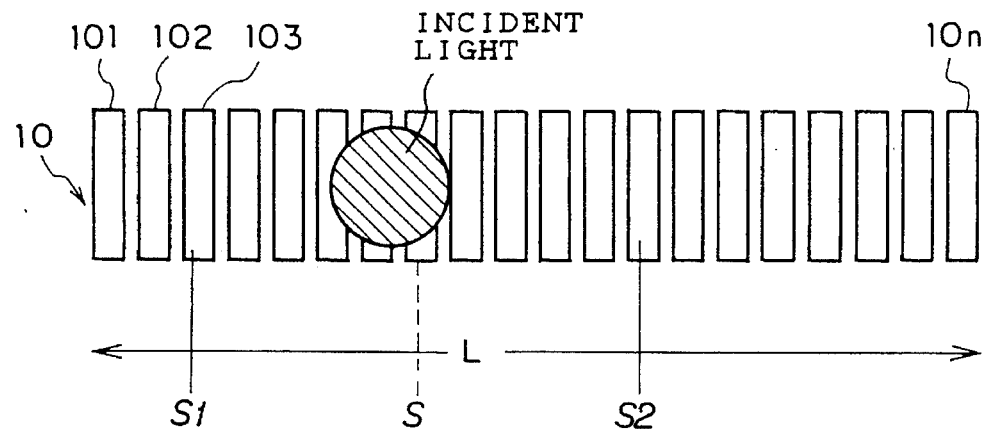
FIG. 10 is a plan view showing the arrangement of light-receiving elements arranged in the light-receiving section in FIG. 9.
Figure 11:
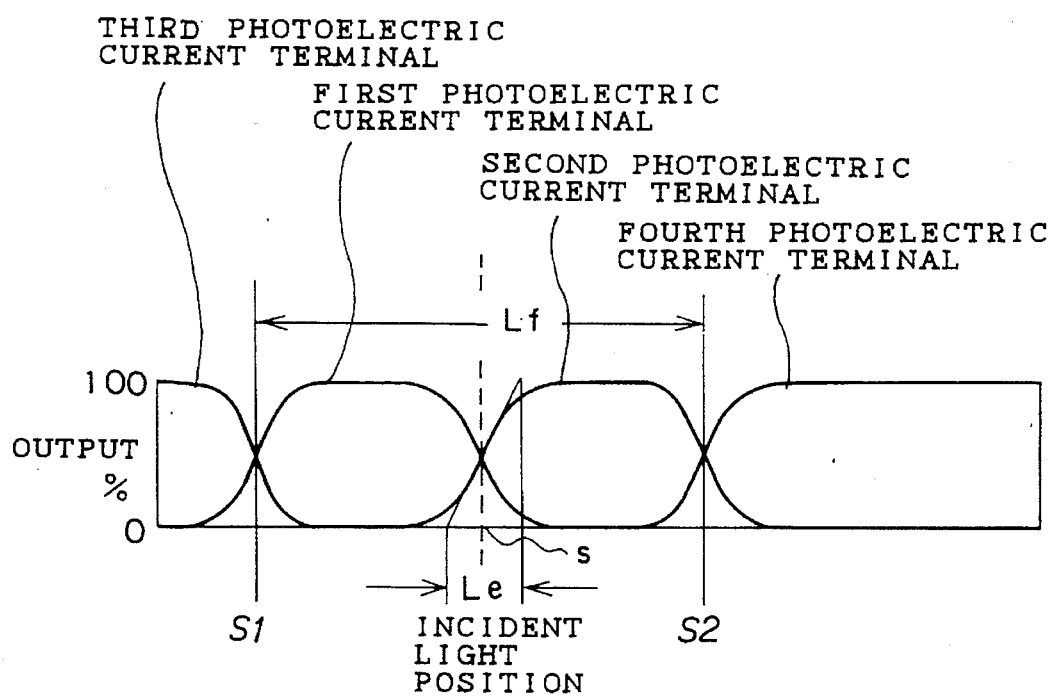
FIG. 11 is a characteristic diagram explaining the light-position-sensing sensibility of the light-receiving section in FIG. 9.
Figure 12:
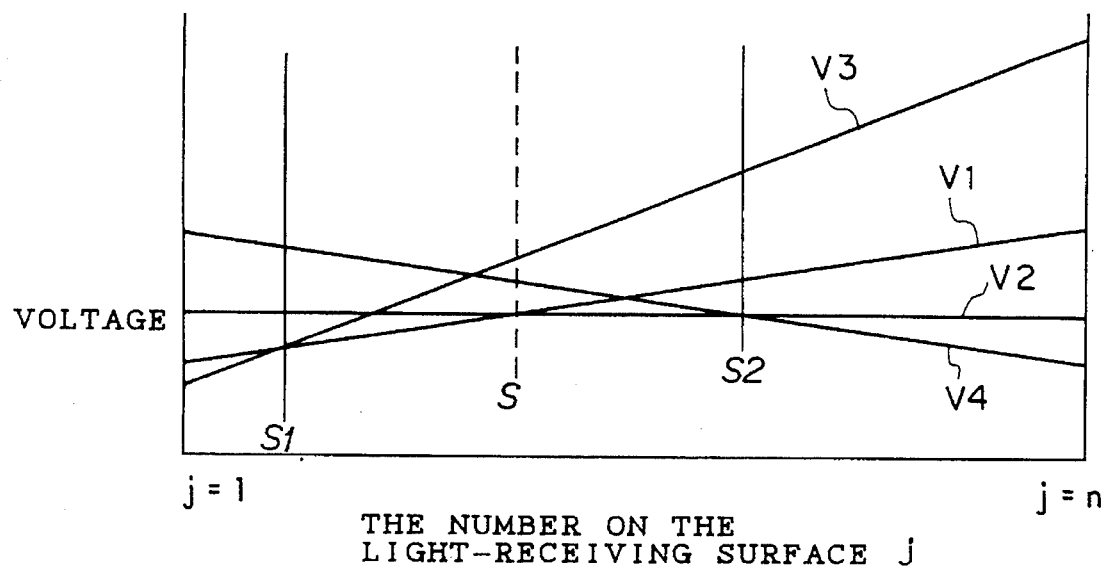
FIG. 12 is a characteristic diagram showing a relationship between the positions on the light-receiving surface of the light-receiving section in FIG. 9 and voltages.

FIG. 9 is a second embodiment of the current-division section, a part of the light-receiving section and a part of the current-division-controlling section of FIG. 5 in detail; FIG. 10 is a plan view showing the arrangement of light-receiving elements composing the light-receiving section of the photoelectric conversion method and apparatus thereof of the invention; FIG. 11 is a characteristic diagram explaining the light-position-sensing sensibility of the light-receiving section in FIG. 10; FIG. 12 is a characteristic diagram showing a relationship between the positions on the light-receiving surface of the light-receiving section in FIG. 9 and FIG. 10 and voltages.

As the subject matter of the invention is in the light-receiving section 4, the current-division section 12 and the current-division-controlling section in FIG. 5, they will be described in further detail. FIG. 9 shows the subjective matter of the invention: the jth light-receiving element; the jth current divider comprising four transistors $Q_{j1}$, $Q_{j2}$, $Q_{j3}$ and $Q_{j4}$; photoelectric current signals T1, T2, T3 and T4 connected to the first, the second, the third and the fourth photoelectric current output terminal respectively; and voltages V1(1), V2(1), V3(1), V4(1), V1(j), V2(j), V3(j), V4(j), V1(n), V2(n), V3(n) and V4(n) generated in the current-division-controlling section 14.

First, the current-division-controlling section will be described.

The jth (j=1, 2, 3, ..., n) current-division-controlling voltage is denoted as follows.

That is:

$$V1(j) = Vr + g * j$$

$$V2(j) = Vr + Vp11$$

$$V3(j) = (1+h) * V1(j) - j * V2(j) + w1$$

$$V4(j) = -h * V1(j) + (1+h) * V2(j) + w2$$

where Vp11 is a set voltage determined in setting section 26 and where g>0, h>0, w1>0 and w2>0.

In the case where V1(η)=V2(η) is satisfied in the point of j=η, the four voltages are denoted as follows.

$$\begin{aligned} V1(\eta) &= Vr + g * \eta \\ = V2(\eta) &= Vr + Vp11 \\ V3(\eta) &= (1+h) * V1(\eta) - h * V2(\eta) + w1 \\ V4(\eta) &= -h * V1(\eta) + (1+h) * V2(\eta) + w2 \end{aligned}$$

The relationships of the above equations comes to be as follows.

$$V1(\eta) = V2(\eta)$$
$$= V3(\eta) + w1$$
$$= V4(\eta) + w2$$

Then, the jth controlling voltages V1, V2, V3 and V4 are denoted in use of $\eta$ as follows.

$$V1(j) = V1(\eta) + g * (j-\eta)$$

$$V2(j) = V2(\eta) = V1(\eta)$$

$$V3(j) = V1(\eta) + (1+h) * g * (j-\eta) + w1$$

$$V4(j) = V1(\eta) - h * g * (j-\eta) + w2$$

Therefore:

$$V2(j) - V1(j) = g * (j-\eta)$$

$$V3(j) - V1(j) = h * g * (j-\eta) + w1$$

$$V4(j) - V2(j) = -h * g * (j-\eta) + w2$$

The j making these equations 0 is calculated as follows.
In case of $j = \eta$ $V2(j) - V1(j) = 0$
In case of $j = \eta - w1/(h * g)$ $$V3(j) - V1(j) = 0$$

In case of $j = \eta + w2/(h * g)$ $$V4(j) - V2(j) = 0$$

The magnitude relationship of the four voltages can be arranged as follows.
In case of $j < \eta - w1/(h * g)$ $$V3 < V1 < V2 < V4$$

In case of $j = \eta - w1/(h * g)$ $$V3 = V1 < V2 < V4$$

In case of $\eta - w1/(h * g) < j < \eta$ $$V3 > V1 < V2 < V4$$

In case of $j = \eta$ $$V3 > V1 = V2 < V4$$

In case of $\eta < j < \eta + w2/(h * g)$ $$V3 > V1 > V2 < V4$$

In case of $j = \eta + w2/(h * g)$ $$V3 > V1 > V2 = V4$$

In case of $j < \eta + w2/(h * g)$ $$V3 > V1 > V2 > V4$$

Above relationships can be depicted in FIG. 12.

The current channel of the photoelectric current I(j) of the jth light-receiving element in FIG. 9 will be described hereinafter.

The jth current divider is composed of four transistors Qj1, Qj2, Qj3 and Qj4 whose emitters all connected each other. Current division ratios are controlled by the base voltages of these four transistors. The four current division ratios of the four transistors are denoted as k1(j), k2(j), k3(j) and k4(j). As it is known that the exponential functions of the difference magnitudes among each transistor's base voltage determine the current division ratios k1(j), k2(j), k3(j) and k4(j) of the four transistors, we will explain it by using the relationships of V1, V2, V3 and V4 above mentioned.

As the relationship is V3<V1<V2<V4 in case of $j < \eta - w1/(h * g)$, the ratios come to k3(j)>k1(j)>k2(j)>k4(j). Then, the currents I1(j), I2(j), I3(j) and I4(j) divided to the transistors Qj1, Qj2, Qj3 and Qj4 come to I3(j)>I1(j)>I2(j)>I4(j). That is, much of the current I(j) passes through the transistor Qj3 and flows to the line T3 leading to the third photoelectric current terminal.

As the relationship is V3=V1<V2<V4 in case of $j = \eta - w1/(h * g)$, the ratios come to k3(j)=k1(j)>k2(j)>k4(j). Then, the currents I1(j), I2(j), I3(j) and I4(j) divided to the transistors Qj1, Qj2, Qj3 and Qj4 come to I3(j)=I1(j)>I2(j)>I4(j). That is, much of the current I(j) is equally divided and passes through the transistor Qj1 and Qj3, and flows to the line T1 and T3 leading to the first and third photoelectric current terminal respectively.

As the relationship is V3>V1<V2<V4 in case of $\eta - w1/(h * g) < j < \eta$, the ratios come to k3(j)<k1(j)>k2(j)>k4(j). Then, the currents I1(j), I2(j), I3(j) and I4(j) divided to the transistors Qj1, Qj2, Qj3 and Qj4 come to I3(j)<I1(j)>I2(j)>I4(j). That is, much of the current I(j) is passes through the transistor Qj1 and flows to the line T1 leading to the first photoelectric current terminal.

As the relationship is V3>V1=V2<V4 in case of $j=\eta$, the ratios come to k3(j)<k1(j)=k2(j)>k4(j). Then, the currents I1(j), I2(j), I3(j) and I4(j) divided to the transistors Qj1, Qj2, Qj3 and Qj4 come to I3(j)<I1(j)=I2(j)>I4(j). That is, much of the current I(j) is equally divided and passes through the transistor Qj1 and Qj2, and flows to the line T1 and T2 leading to the first and second photoelectric current terminal.

As the relationship is V3>V1>V2<V4 in case of $\eta < j < \eta + w2/(h * g)$, the ratios come to k3(j)<k1(j)<k2(j)>k4(j). Then, the currents I1(j), I2(j), I3(j) and I4(j) divided to the transistors Qj1, Qj2, Qj3 and Qj4 come to I3(j)<I1(j)<I2(j)>I4(j). That is, much of the current I(j) is passes through the transistor Qj2 and flows to the line T2 leading to the second photoelectric current terminal.

As the relationship is V3>V1>V2=V4 in case of $j = \eta + w2/(h * g)$, the ratios come to k3(j)<k1(j)<k2(j)=k4(j). Then, the currents I1(j), I2(j), I3(j) and I4(j) divided to the transistors Qj1, Qj2, Qj3 and Qj4 come to I3(j)<I1(j)<I2(j)=I4(j). That is, much of the current I(j) is equally divided and passes through the transistor Qj2 and Qj4, and flows to the line T2 and T4 leading to the second and fourth photoelectric current terminal.

As the relationship is V3>V1>V2>V4 in case of $j < \eta + w2/(h * g)$, the ratios come to k3(j)<k1(j)<k2(j)<k4(j). Then, the currents I1(j), I2(j), I3(j) and I4(j) divided to the transistors Qj1, Qj2, Qj3 and Qj4 come to I3(j)<I1(j)<I2(j) <I4(j). That is, much of the current I(j) is passes through the transistor Qj4 and flows to the line T4 leading to the fourth photoelectric current terminal.

Therefore, the relationship between the incident light positions and four output terminals in the case where an incident light exists on the n light-receiving elements array on the light-receiving surface comes to be shown as FIG. 11.

As having described heretofore, the operation being equivalent to the light-receiving element's operation divided in four sections, as shown in FIG. 11, in the case where the jth (j=1, 2, 3, . . . , n) current-division-controlling voltages are set as follows.

$$V1(j) = Vr + g * j$$

$$V2(j) = Vr + Vp11$$

$$V3(j) = (1+h) * V1(j) - h * V2(j) + w1$$

$$V4(j) = -h * V1(j) + (1+h) * V2(j) + w2$$

As Vp11 is a set voltage determined by setting section 26, the value of η can be varied arbitrarily by varying the Vp11 in proportion to the handling m amount of the handling section 15. That is, the equivalent dividing position varies in proportion to the handling amount in the handling section 15.

In the aforementioned discussion, j can be set as positive integers. In fact, incident light is not a dot, but has some largeness. In the case where the diameter of incident light is larger than the pitch of the light-receiving elements, as shown in FIG. 10, j can be processed as real numbers larger than 1 in the equations above mentioned. Then, the relationship between the light incident positions and the four photoelectric current outputs can be obtained as a smooth relationship to the incident positions, as shown in FIG. 11.

In the case where the diameter of incident light is smaller than the pitch of the light-receiving elements, on the contrary, it is not preferable to handle the j as real numbers larger than 1, because the errors to the actual phenomenon come to be large. To put it concretely, the pitch wave of the light-receiving elements is superposed over the smooth lines in FIG. 11. That is, the light-receiving apparatus of the invention is particularly effective in case of sensing the position-sensing of the light having a larger spot diameter than the location pitch of the light-receiving elements 10.

The characteristic obtained by using the currents flowing in T1 and T2 as two light-position-sensing signals comes to be equivalent to the characteristic of the light-receiving element having a light-receiving section whose length is Lf and divided into two parts in S section.

The functions of V1, V2, V3 and V4 were-described above, then the means generating these voltages actually in the current-division-controlling section 14 will be described, hereinafter.

The current-division section has n current dividers, and each of them needs to be given a control voltage separately. Namely, $(4 * n)$ kinds of voltages exist. In the example above mentioned, $(3 * n+1)$ kinds of voltages exist, since V2 does not depend on the j value. As n comes to be an unrealistic number when it is getting larger because the number of actual wirings is needed as much, n has the upper limit.

Following method is effective to solve the problem. Namely, the both end voltages V1(1), V2(1), V3(1), V4(1); and V1(n), V2(n), V3(n), V4(n) of the four control voltages V1, V2, V3 and V4 are generated first. Next, (n−1) resistors are connected in series, and voltages Vi(1) and Vi(n) {i=1~4} are imposed on both ends of the resistors to be divided by them. The voltages on the midst of the resistive division points are denoted as Vi(j). Then the light-receiving element 10, four transistors composing the current divider arid the jth resistor of the above mentioned resistors are located as the j th block parts. As the wirings which connect the {j−1}th block with {j+1}th block come to occupy the major part of the total wirings by taking such a composition, the wirings from the current-division section 14 to this block can be greatly decreased and the number comes to be independent of the n value. Therefore, the composition comes not to limit the n. Decreasing the wiring number as above noted is particularly effective on making the light-position-sensing apparatus of the invention into an integrated circuit in some cases. The above mentioned method using resistors in series makes it possible to cross solidly between IC wiring layers and IC resistor layers.

Besides, a resistor is drawn in the line V2 in FIG. 9, but the resistor can be omitted in the case where wirings in a solid crossing are not needed, since V2(1) and V2(n) are equal. (Sometimes this resistor is inserted expressly for wiring in a solid crossing on the case where it is needed because the wirings in integrated circuits are complicated. This method is called Duck-Under sometimes.)

Vi(1), Vi(n) {i=1~4} come to as follows in this case.

$$V1(1) = Vr + g$$

$$V1(n) = Vr + g * n$$

$$V2(1) = Vr + Vp11$$

$$V2(n) = Vr + Vp11$$

$$V3(1) = (1+h) * V1(1) - h * V2(1) + w1$$

$$V3(n) = (1+h) * V1(n) - h * V2(n) + w1$$

$$V4(1) = -h * V1(1) + (1+h) * V2(1) + w2$$

$$V4(n) = -h * V1(n) + (1+h) * V2(n) + w2$$

Though we have discussed about the examples of the functions of V1, V2, V3 and V4, heretofore, the functions are not limited to the mentioned ones. After all, the functions which satisfy the next relations of current-division ratios k1(j), k2(j), k3(j) and k4(j) obtained by the four transistors bring about substantially same operations.

In case of $j < \eta - w1/(h * g)$, $k3(j) < k1(j) < k2(j) < k4(j)$.
In case of $j = \eta - w1/(h * g)$, $k3(j) = k1(j) > k2(j) > k4(j)$.
In case of $\eta - w1/(h * g) < j < \eta$, $k3(j) < k1(j) > k2(j) > k4(j)$.
In case of $j = \eta$, $k3(j) < k1(j) = k2(j) > k4(j)$.
In case of $\eta < j < \eta + w2/(h * g)$, $k3(j) < k1(j) < k2(j) > k4(j)$.
In case of $j = \eta + w2/(h * g)$, $k3(j) < k1(j) < k2(j) = k4(j)$.
In case of $j < \eta + w2/(h * g)$, $k3(j) < k1(j) < k2(j) < k4(j)$.

In the case where an incident light sensed by the light-receiving section 4 is an alternative component by the irradiation of a pulse light, a DC bias current source 99 can be paralleled to the photoelectric current in the current divider, as shown in FIG. 6. The response speed of the current divider can be improved by the current source 99.

Figure 9A:
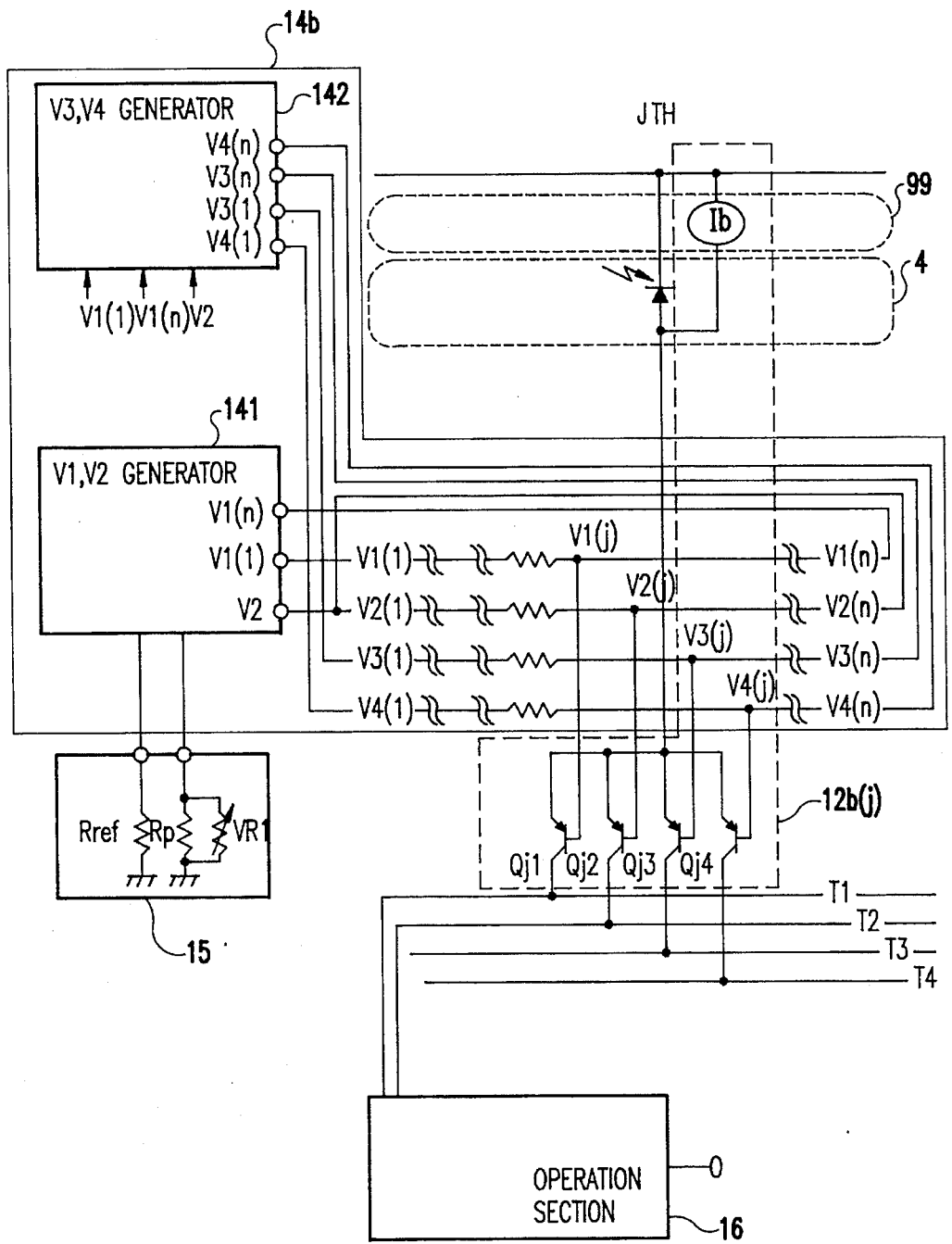
FIG. 9A is a circuit diagram showing the light receiving section, the reference voltage setting section, the current division controlling section, and the current division section of the second embodiment.

As shown in FIG. 9A, the current division controlling section 14b includes two voltage generators 141 and 142. The voltage generator 141 is a generator for generating the voltages V1(1), V1(n) described above. Note that V2, that is V2(1) and V2(n), is independent from the number n. The V3, V4 voltage generator 142 generates the voltages V3(1), V4(1), V3(n) and V4(n) described above. The construction of the voltage generators 141 and 142 themselves is well known to those skilled in the art. In addition, the construction of the V1, V2 generator 142 shown in FIG. 9A is substantially the same as a circuit derived from the current division controlling section 14a shown in FIG. 6. That is, by removing the series of resistors Rj+1, Rj, Rj−1, ... from the current division controlling section 14a shown in FIG. 6, and by substituting a comparator 91 for the pair of transistors receiving at their bases the voltages $\alpha V_1$ and Rref at the point b in FIG. 6, the V1, V2 generator is realized.

Figure 9B:
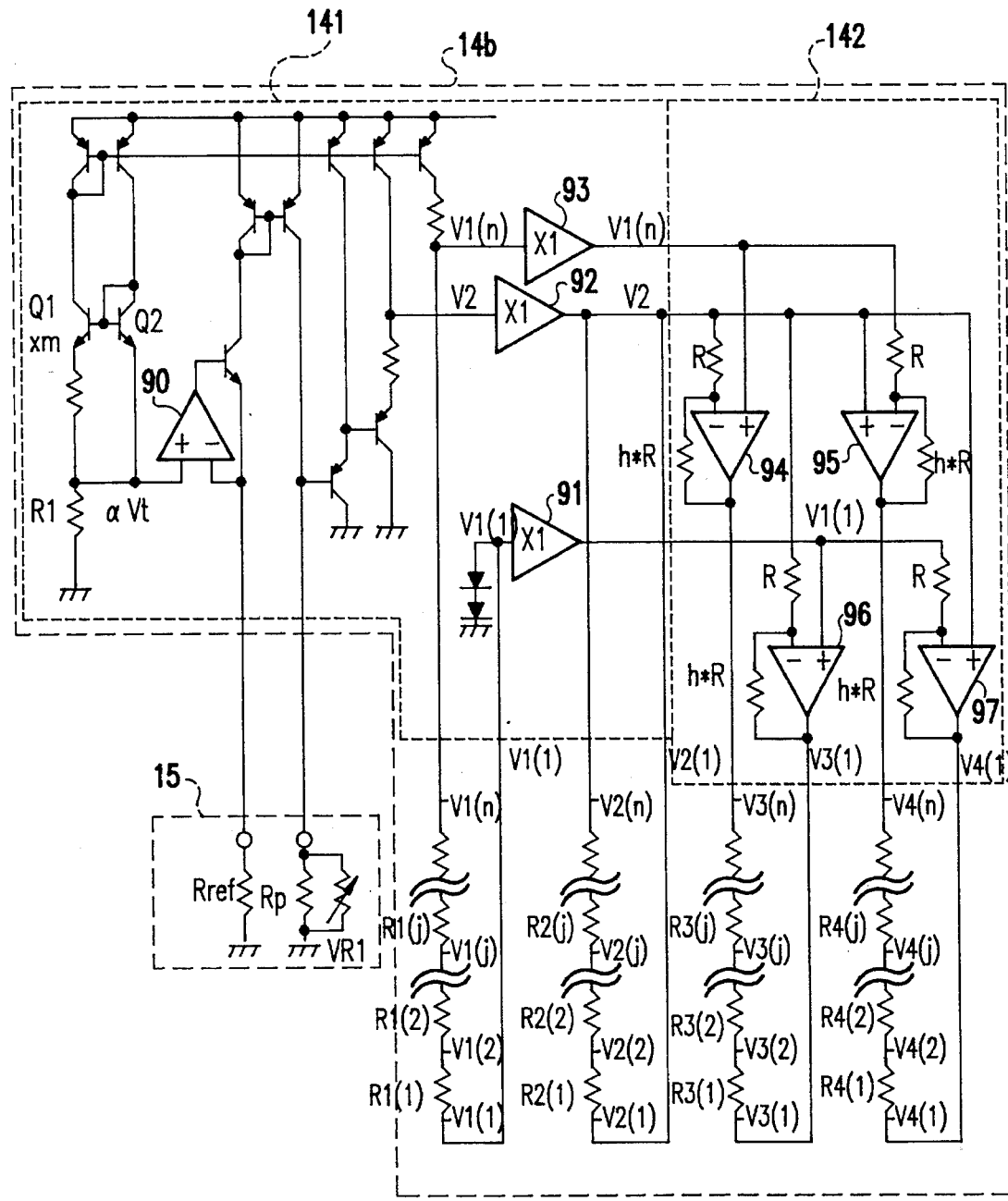
FIG. 9B is a detailed circuit diagram of the current division controlling section of the second embodiment.

As can be seen from FIG. 9B, the V1, V2 generator 141 includes transistors, resistors, and the comparator 90, buffers 91 to 93 and diodes to generate the voltage V1(1), V1(n), and V2(1)=V2(n)=V2. The V3, V4 generator 142 includes resistors and operational amplifiers 94 to 97 to generate the voltage V3(1) at the output of the operational amplifier 96, the voltage V4(1) at the output of the operational amplifier 97, the voltage V3(n) at the output of the operational amplifier 94, and the voltage V4(n) at the output of the operational amplifier 95. With the above definitions of the voltages V1 (1), V1(n), V2, V3(n), V4(n), V3(a), and V4(1) the circuit shown in FIG. 9B can easily be determined.

In FIG. 9B, the amplification factor h of each of the operational amplifiers 94–97 is 1. Therefore, the expressions of the voltages V1(j), V2(j), V3(j), and V4(j) can be rewritten as follows, where h=1:

$$V1(j) = Vr + g * j$$

$$V2(j) = Vr + Vp11$$

$$V3(j) = 2 * V1(j) - V2(j) + w1$$

$$V4(j) = -V1(j) + 2 * V2(j) + w2$$

The above expressions can be further changed as:

$$V1(j) = Vr + g * j$$

$$V2(j) = Vr + Vp11$$

$$V3(j) = Vr + 2 * g * j - Vp11 + w1$$

$$V4(j) = Vr - g * j + 2 * Vp11 + w2$$

In the above expression, it will be seen that V3 and V4 are functions depending on j.

Now, in FIG. 9B, the output voltage of the operational amplifier 94 is: 2 * V1(n)–V2(n);

the output voltage of the operational amplifier 95 is: –V1(n)+2 * V2(n);

the output voltage of the operational amplifier 96 is: 2 * V1(1)–V2(1); and the output voltage of the: operational amplifier 97 is: –V1(1)+2 * V2(1).

Therefore, as shown in FIG. 9B, the voltage difference between the operational amplifiers is divided by means of the series resistors.

All of the light-receiving section 4, current-division section 12 and current-division-controlling section 14 can be integrated on a substrate, then the method of the invention is effective industrially.

As above mentioned, the invention has effects as follows:

(1) As the invention arranges n (n>2) light-receiving elements in a predetermined direction, and divides each photoelectric current I1, I2, . . . , In of each light-receiving element in predetermined ratios k1 to 1–k1, k2 to 1–k2, . . . , kn to 1–kn, and leads the divided photoelectric currents to the first and the second photoelectric current output terminal, and controls the predetermined ratios in keeping such relationships as k1>0.5>kn and km≦kp (p=m–1; m=2 to n); it has availability that the photoelectric conversion method and the photoelectric conversion apparatus can be obtained; whose sensibility to incident light positions of particular positions on the light-receiving surface can be higher than the other light-position sensing elements' sensibility; and arbitrarily positions on the light-receiving surface of which can be set in high sensitivity; besides whose responsibility can be high speed, further all of the light-receiving section; current-division section and current-division-controlling section of which can be easily integrated on a silicon substrate.

(2) As the invention comprises a light-irradiating section for irradiating a light from its irradiation axis, a light-receiving section having a lens system, n (>2) light-receiving elements arranged in the direction combining the light-irradiating axis and a light receiving axis on a light-receiving surface, n current dividers, a current-division-controlling section, and an operation section; it has availability that the photoelectric conversion apparatus can be obtained; whose sensibility to incident light positions of particular positions (the light position reference position Y0) on the light-receiving surface can be higher than conventional light-position sensing elements (PSD); which can be operated by a small optical system that much, whose reference distance X0 can be freely set; whose sensible distance can be lengthen by using the same optical system, and the capable setting range of the reference distance X0 can be wide.

(3) As the invention comprises a current-division-controlling section for controlling the predetermined ratios of each photoelectric current flowing each light-receiving element according to the reference distance, and an operation section inputted the photoelectric current output and outputting displacements from the reference distance; it has availability that the displacement sensor can be obtained the capable setting range of which is wide, and which has high sensibility and high accuracy.

(4) As the invention comprises a setting section having a reference resistor and a setting resistor, a current-division-controlling section for controlling the predetermined ratios k1, k2, . . . , kn with the ratios of the reference resistor to the set resistor in keeping the relationship of k1>0.5>kn and p≧km (p=m–1), and composes the reference resistor with a trimming resistor for correcting the aberration between the light-irradiating axis and the light-receiving axis; it has availability that the photoelectric conversion apparatus can be obtained; the optical axis aberration generated by the parts tolerances of the optical system, the tolerances on composing etc. of the light-position-sensing apparatus of which can be corrected electrical resistor-trimming, and the correction can be done without influencing the X–Y nonlinearity correction; and the nonlinearity correction of which can be freely attained.

(5) As the invention arranges n (n>2) light-receiving elements (j) {j=1~n} in a predetermined direction, and divides each photoelectric current I(j) of each light-receiving element (j) in four parts I1(j), I2(j), I3(j) and I4(j) in the ratios of k1(j), k2(j), k3(j) and k4(j) respectively, and leads them to the first, the second, the third and the fourth photoelectric current output terminal respectively, and makes the ratios k1(j), k2(j), k3(j) and k4(j) meet the equation of k1(j)+k2(j)+k3(j)+k4(j)=1, and makes k3(j)/k1(j), k1(j)/k2(j) and k2(j)/k4(j) decrease with j, and makes them meet the expressions of k1(1)>k2(1) and k1(n)<k2(n); it has availability that the photoelectric conversion apparatus can be obtained; whose sensibility to the: incident light positions of particular positions on the light-receiving surface can be higher than light-position sensing elements (PSD); whose arbitrary positions on the light-receiving surface can be set in high sensibility; and predetermined length photoelectric current can be derived from the high sensibility positions; further all of the light-receiving section, current-division section and current-division-controlling section of which can be easily integrated on a silicon substrate.

What is claimed is:

1. The photoelectric conversion method comprising the steps of:

arranging n light-receiving elements in a predetermined direction, where n>2;

dividing each photoelectric current I1, I2, . . . , In of each of said light-receiving elements in predetermined ratios k1 to 1–k1, k2 to 1–k2, . . . , kn to 1–kn, respectively;

leading the divided photoelectric currents to a first and a second photoelectric current output terminal; and controlling the predetermined ratios to satisfy relationships k1>0.5>kn and km≦kp, where p=m–1; m=2 to n.

2. A photoelectric conversion apparatus comprising:

n light-receiving elements arranged in a predetermined direction, where n>2;

a current-division section having n current dividers which divide each photoelectric current I1, I2, ..., In of each of said light-receiving elements in predetermined ratios k1 to 1–k1, k2 to 1–k2, ..., kn to 1–kn, and lead each part of each said divided photoelectric current to a first and a second photoelectric current output terminal respectively; and a current-division-controlling section for controlling the predetermined ratios to satisfy relationships k1>0.5>kn and km≦kp, where p=m–1; m=2 to n.

3. A photoelectric conversion apparatus according to claim 2;

wherein a handling section capable of changing said predetermined ratios is connected to said current-division-controlling section.

4. A photoelectric conversion apparatus according to claim 2;

wherein said n current dividers each has a couple of transistors operating as input terminals of said photoelectric current I1, I2, ..., In; and the collector of one of said transistors is connected to said first photoelectric current output terminal, and the collector of the other one of said transistors is connected to said second photoelectric current output terminal.

5. A photoelectric conversion apparatus according to claim 2;

further comprising n direct current sources for biasing, each connected in parallel to the photoelectric current of each said light-receiving elements, respectively.

6. A photoelectric conversion apparatus comprising;

a light-irradiating section for forming a bright spot on an object to be sensed by irradiating light from its irradiating axis;

a light-receiving section for forming the bright spot image on said objection a light-receiving surface through a lens system, wherein the light-receiving section comprises n light-receiving elements arranged in a direction combining the light-irradiating axis and a light-receiving axis on said light-receiving surface, where n>2;

a current-division section having n current dividers which divide each photoelectric current I1, I2, ..., In of each of said light-receiving elements in predetermined ratios k1 to 1–k1, k2 to 1–k2, ..., kn to 1–kn, and lead each divided current to a first and a second photoelectric current output terminal respectively;

an operation section inputted said first and second photoelectric current output and outputting a sensed signal; and a current-division-controlling section for controlling said predetermined ratios to satisfy relationships k1>0.5>kn and km≦kp, where p=m–1 and m=2 to n.

7. A photoelectric conversion apparatus according to claim 6;

wherein a handling section capable of changing of said predetermined ratios is connected to said current-division-controlling section.

8. A photoelectric conversion apparatus according to claim 6;

wherein said operation section is inputted said first and second photoelectric output terminals, and outputs displacements from a reference distance set in a setting section.

9. A photoelectric conversion apparatus according to claim 6;

wherein said current-division-controlling section controls a ratio between a reference resistor and a setting resistor of a setting section including a handling section having the reference resistor and the setting resistor so that said predetermined ratios satisfy relationships k1>0.5>kn and kp≧km, where p=m–1 and m=2 to n.

10. A photoelectric conversion apparatus according to claim 9;

said reference resistor is composed of a trimming resistor correcting an aberration between said light-irradiating axis and said light-receiving axis.

11. A photoelectric conversion apparatus according to claim 6;

further comprising n direct current source for biasing, each connected in parallel to each of said current dividers respectively.

12. A photoelectric conversion apparatus according to claim 6;

further having a setting section composed of a reference resistor and a setting resistor comprising a parallel circuit of a variable resistor and a fixed resistor, said setting section adjusting the predetermined ratios and setting a distance of a photoelectric sensor.

13. A photoelectric conversion apparatus according to claim 12;

wherein an outer power supply is connected in place of said variable resistor.

14. A photoelectric conversion apparatus according to claim 6;

wherein all of said light-receiving section, current-division section and current-division-controlling section are integrated in a substrate.

15. The photoelectric conversion method comprising the steps of:

arranging n light-receiving elements {j}, where j=1~n and n>2 in a predetermined direction;

dividing each photoelectric current I{j} of each of said light-receiving elements {j} in four parts I1{j}, I2{j}, I3{j} and I4{j} in ratios of k1{j}, k2{j}, k3{j} and k4{j} respectively;

leading the four parts of each said photoelectric current to a first, a second, a third and a fourth photoelectric current output terminal respectively; and making said ratios k1{j}, k2{j}, k3{j} and k4{j} meet the equation of k1{j}+k2{j}+k3{j}+k4{j}=1, and making k3{j}/k1{j}, k1{j}/k2{j} and k2{j}/k4{j} decrease as j increases, further making them meet expressions of k1{1}>k2{1} and k1{n}<k2{n}.

16. A photoelectric conversion apparatus comprising:

a light-receiving section including n light-receiving elements {j} arranged in a predetermined direction, where j=1, 2, ..., or n, and n>2;

a reference-voltage setting section for setting a variable reference voltage;

a current-division-controlling section, connected to said reference voltage setting section, for setting, based on said variable reference voltage, current-division ratios k1{j}, k2{j}, k3{j}, and k4{j} in such a manner that said current-division ratios k1{j}, k2{j}, k3{j} and k4{j} satisfy equation k1{j}+k2{j}+k3{j}+k4{j}=1, and k3{j}/k1{j}, k1{j}/k2{j} and k2{j}/k4{j} decrease in accordance with an increase of j, further said ratios $k1\{1\}$, $k2\{1\}$, $k1\{n\}$ and $k2\{n\}$ satisfy conditions of $k1\{1\}>k2\{1\}$ and $k1\{n\}<k2\{n\}$; and a current-division section having n input ends and two output ends, and including n current dividers respectively connected to said n light-receiving elements;

wherein each of said n current dividers receiving a photoelectric current from a corresponding one of said light-receiving elements through a corresponding one of said n input ends to divide said photoelectric current into four output currents $I1\{j\}$, $I2\{j\}$, $I3\{j\}$ and $I4\{j\}$ with said current-division ratios of $k1\{j\}$, $k2\{j\}$, $k3\{j\}$ and $k4\{j\}$ respectively, and to output first two $I1\{j\}$ and $I2\{j\}$ of said four output currents to said two output ends of said current division section; and the first two output currents $I1\{j\}$ and $I2\{j\}$ from said n current dividers are respectively added and output from said two output ends of said current-division section.

17. A photoelectric conversion apparatus according to claim 16, wherein each of said n current dividers comprises four transistors each having an input end commonly connected to the corresponding one of said n light-receiving elements, and a control end connected to receive a control voltage corresponding to the corresponding one of said current-division ratios $k1\{j\}$, $k2\{j\}$, $k3\{j\}$ and $k4\{j\}$, two of said four transistors receiving said current ratios $k1\{j\}$ and $k2\{j\}$ having output ends connected to said two outputs of said current-division section.

18. A photoelectric conversion apparatus according to claim 16 further comprising n direct current biasing sources respectively connected in parallel to said light-receiving elements.

19. A photoelectric conversion apparatus according to claim 16, wherein said light-receiving section, said current-division section, and said current-division-controlling section are all integrated on a substrate.

* * * * *